United States Patent
Hwang et al.

(10) Patent No.: US 9,622,056 B2
(45) Date of Patent: Apr. 11, 2017

(54) MOBILE TERMINAL AND CONTROLLING METHOD THEREOF FOR EXTRACTING AVAILABLE PERSONAL INFORMATION CORRESPONDING TO RECOGNIZED FACES

(71) Applicant: LG ELECTRONICS INC., Seoul (KR)

(72) Inventors: Myunghee Hwang, Seoul (KR); Kimoon Lee, Seoul (KR); Soojeong Hwang, Seoul (KR); Nalin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

(21) Appl. No.: 13/900,213

(22) Filed: May 22, 2013

(65) Prior Publication Data

US 2014/0011487 A1     Jan. 9, 2014

(30) Foreign Application Priority Data

Jun. 7, 2012     (KR) .................... 10-2012-0060729

(51) Int. Cl.
*H04B 1/38*     (2015.01)
*H04W 4/16*     (2009.01)
(Continued)

(52) U.S. Cl.
CPC .......... *H04W 4/16* (2013.01); *G06K 9/00221* (2013.01); *H04M 1/27455* (2013.01); *H04M 1/274516* (2013.01); *H04M 2250/62* (2013.01)

(58) Field of Classification Search
CPC ....... H04M 1/27455; H04M 1/274516; H04M 2250/62; G06K 9/00221; H04W 4/16
See application file for complete search history.

(56) References Cited

U.S. PATENT DOCUMENTS 8,116,727 B1 *   2/2012   Kates ................ H04M 1/72572
                                                                455/405
8,447,863 B1 *   5/2013   Francis, Jr. ....... G06F 17/30542
                                                                707/724
(Continued)

FOREIGN PATENT DOCUMENTS

CN       101854261 A       10/2010
CN       102223436 A       10/2011
(Continued)

*Primary Examiner* — Nathan Mitchell
*Assistant Examiner* — Dung Lam
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a memory configured to store a phonebook database including personal information and a profile image of each of a plurality of counterparts; a memory; a display unit; and a controller configured to recognize faces of people in an image displayed on the display unit, extract available personal information from the phonebook database of counterparts corresponding to the recognized faces, and perform a group call or a group chat, via the wireless communication unit, with the corresponding counterparts using the extracted personal information.

18 Claims, 14 Drawing Sheets

(51) Int. Cl.
 *G06K 9/00* (2006.01)
 *H04M 1/2745* (2006.01)

(56) References Cited

U.S. PATENT DOCUMENTS

| | | | |
|---|---|---|---|
| 8,620,136 B1* | 12/2013 | Malegaonkar et al. | 386/239 |
| 2008/0095527 A1 | 4/2008 | Lee et al. | |
| 2009/0037477 A1* | 2/2009 | Choi et al. | 707/104.1 |
| 2010/0216441 A1* | 8/2010 | Larsson et al. | 455/415 |
| 2011/0013810 A1* | 1/2011 | Engstrom et al. | 382/118 |
| 2011/0256907 A1 | 10/2011 | Lee et al. | |
| 2012/0311080 A1* | 12/2012 | Alsina | H04L 67/2842 709/217 |
| 2013/0143529 A1* | 6/2013 | Leppanen | H04W 4/08 455/411 |
| 2013/0321340 A1* | 12/2013 | Seo | G06F 1/1641 345/174 |
| 2014/0273977 A1* | 9/2014 | Colletti | 455/412.2 |
| 2015/0135098 A1 | 5/2015 | Geppert et al. | |

FOREIGN PATENT DOCUMENTS

| | | |
|---|---|---|
| EP | 2 023 583 A1 | 2/2009 |
| EP | 2 180 674 A1 | 4/2010 |
| EP | 2 237 533 A1 | 10/2010 |
| JP | 2006-165821 A | 6/2006 |
| KR | 10-2011-0136078 A | 12/2011 |
| WO | WO 2009/046574 A1 | 4/2009 |

\* cited by examiner

FIG. 7
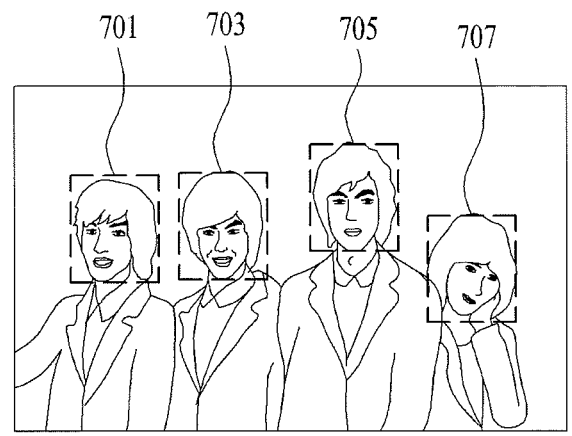
(a)
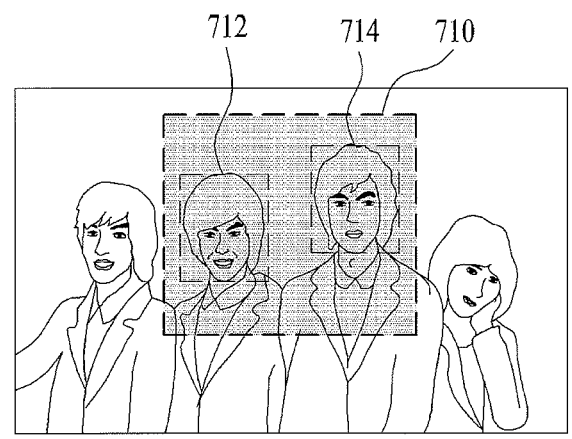
(b)

FIG. 14
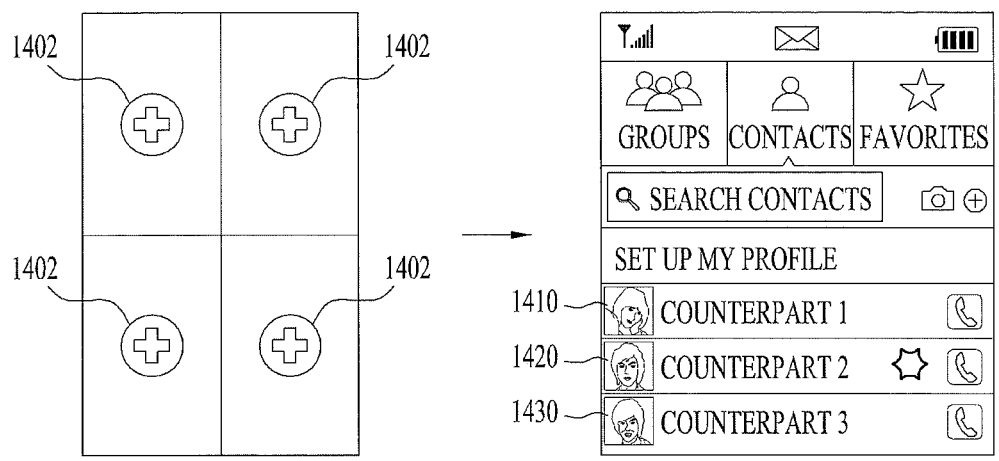
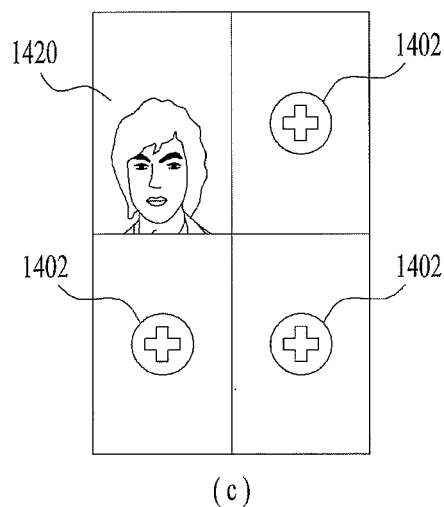

FIG. 15
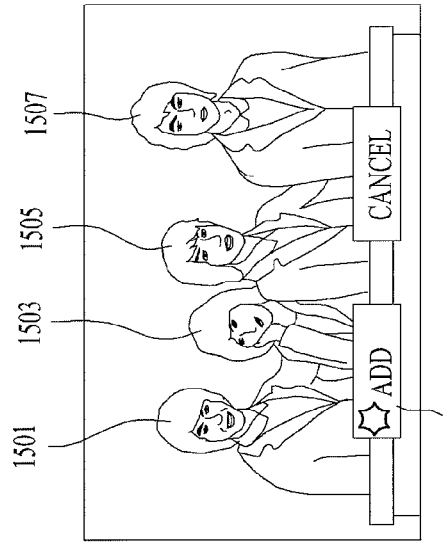
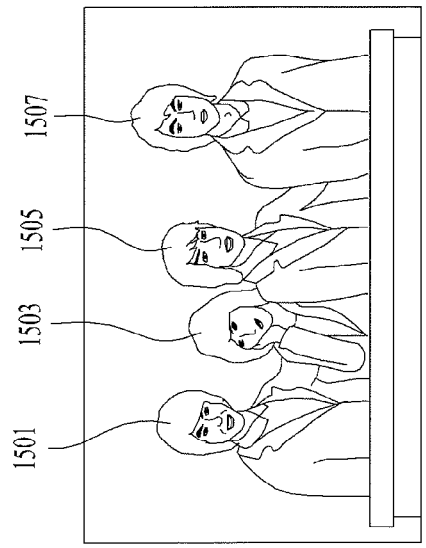
(a)
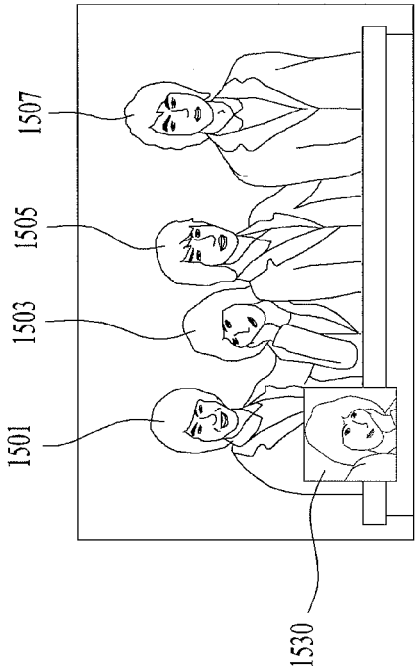
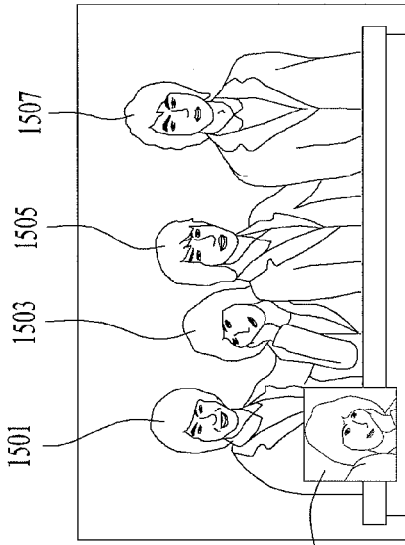
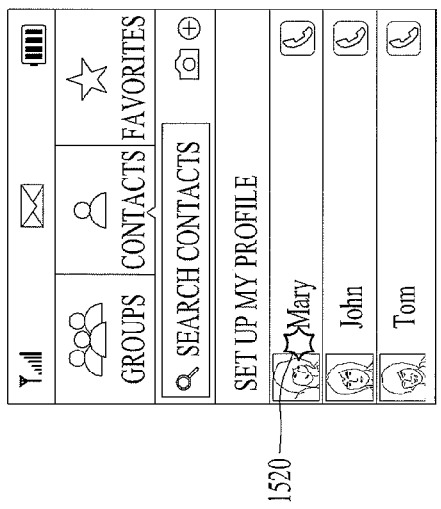
(b)
(c)
(d)

MOBILE TERMINAL AND CONTROLLING METHOD THEREOF FOR EXTRACTING AVAILABLE PERSONAL INFORMATION CORRESPONDING TO RECOGNIZED FACES

Pursuant to 35 U.S.C. §119(a), this application claims the benefit of earlier filing date and right of priority to Korean Application No. 10-2012-0060729, filed on Jun. 7, 2012, the contents of which are hereby incorporated by reference herein in their entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for performing communication with characters or people displayed in a character or person image using the character or person image.

Discussion of the Related Art

Generally, terminals can be classified into mobile/portable terminals and stationary terminals. The mobile terminals can be further classified into handheld terminals and vehicle mount terminals according to possibility of user's direct portability.

As functions of the terminal are getting diversified, the terminal tends to be implemented as a multimedia player provided with composite functions such as photographing of photos or videos, playback of music or video files, game play, broadcast reception and the like for example.

Generally, a method of contacting a specific counterpart using a related art mobile terminal includes dialing a phone number of the specific counterpart. In attempting a call connection with a specific counterpart, the user directly inputs a phone number of the specific counterpart using a keypad or selects the specific counterpart from a list of a plurality of counterparts saved in a phonebook.

However, the related art method is inconvenient when performing a group call or chat with a specific counterpart. For instance, it is inconvenient to select all users to try a group call connection in performing a group call. Hence, the need for a method of performing a group call or a group chat more conveniently is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which a group call or a group chat can be attempted more effectively than that of the related art.

Another object of the present invention is to provide a mobile terminal and controlling method thereof, by which an attempt of a group call or a group chat can be performed on a plurality of counterparts based on images.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a phonebook database configured to include personal information and a profile image of each of a plurality of counterparts, a memory configured to save a character or person image having a plurality of characters or people displayed therein, a display unit configured to display the character or person image, and a controller configured to recognize faces of the characters or people displayed in the character or person image, determine whether the counterpart estimated as the same character or person of the recognized face is included in the phonebook database, extract the personal information of the counterpart estimated as the same character or person of the recognized face from the phonebook database, and perform a group call or a group chat on the characters or people displayed in the character or person image using the extracted personal information.

In another aspect of the present invention, a method of controlling a mobile terminal according to the present invention may include the steps of displaying a character or person image having characters or people displayed therein, recognizing faces of the characters or people displayed in the character or person image, extracting personal information of the counterpart estimated as the same character or person of the recognized face from the phonebook database, and performing a group call or a group chat on the characters or people displayed in the character or person image using the extracted personal information.

In a further aspect of the present invention, a computer-readable recording medium according to the present invention may include a mobile terminal controlling method recorded therein, the mobile terminal controlling method including a first command for displaying a character or person image having characters or people displayed therein, a second command for recognizing faces of the characters or people displayed in the character or person image, a third command for extracting personal information of the counterpart estimated as the same character or person of the recognized face from the phonebook database, and a fourth command for performing a group call or a group chat on the characters or people displayed in the character or person image using the extracted personal information.

Accordingly, the present invention provides the following advantages.

First of all, the above-configured mobile terminal according to at least one embodiment of the present invention can effectively attempt a group call or chat with a plurality of counterparts.

Secondly, the above-configured mobile terminal according to at least one embodiment of the present invention can attempt a group call or chat with a plurality of counterparts based on images.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 7 is a diagram illustrating an example of a face recognition algorithm applied range when a plurality of counterparts are displayed on a character or person image;

FIG. 14 is a diagram illustrating one example of a process for configuring a character or person image having a plurality of counterparts displayed thereon using a profile image of a counterpart included in a phonebook database; and FIG. 15 is a diagram for one example of a process for configuring a character or person image by adding a profile image of a counterpart, who is to join a group communication, onto a previously saved image.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipment, smart phones, digital broadcast receivers, personal digital assistants, laptop computers, portable multimedia players (PMP), navigators and the like. However, a configuration according to an embodiment disclosed in this specification is applicable to such a fixed terminal as a digital TV, a desktop computer and the like as well as a mobile terminal.

Figure 1:
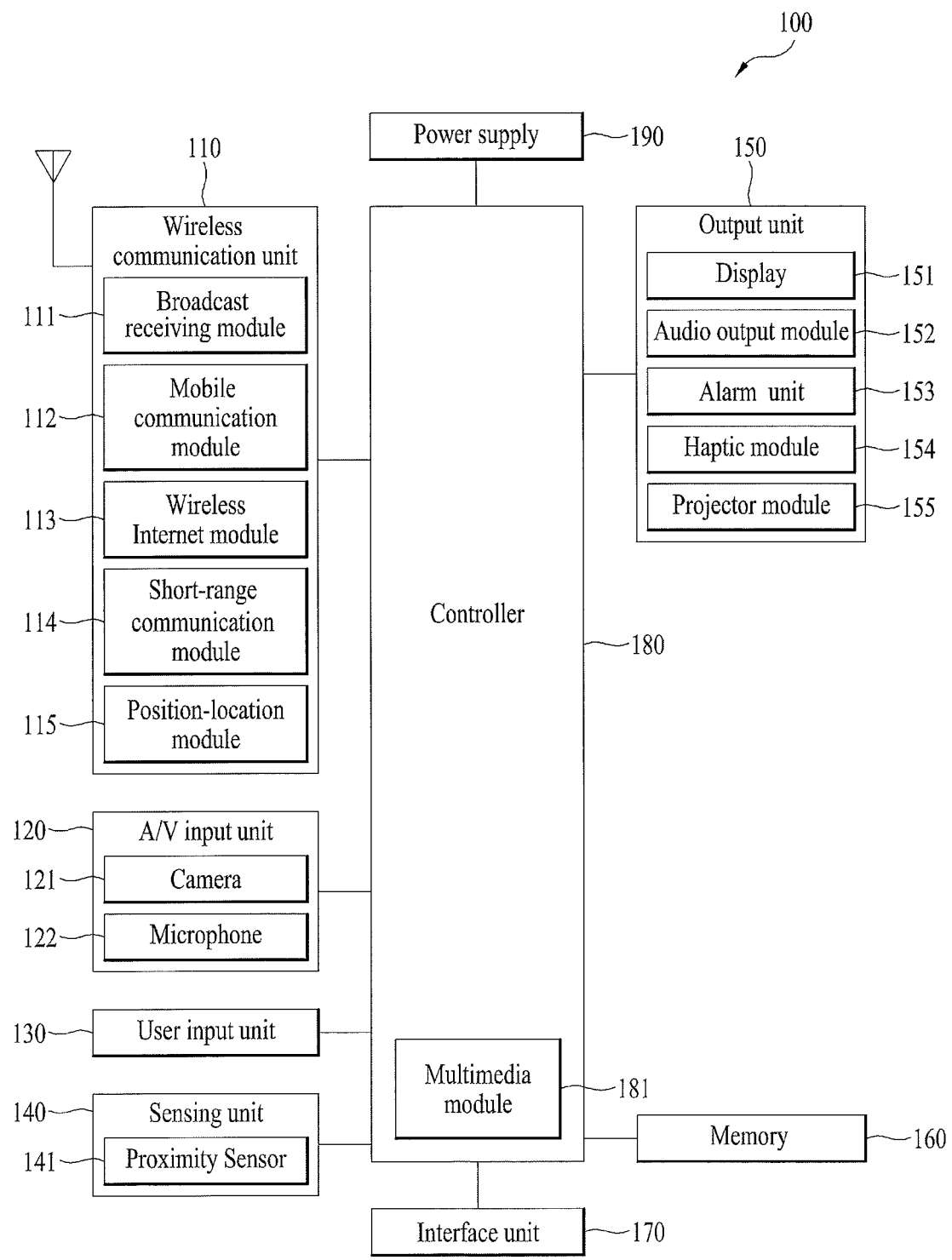
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 including a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but implementing all of the illustrated components is not a requirement. Greater or fewer components may alternatively be implemented.

In the following description, the above elements of the mobile terminal 100 are explained in sequence. First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time information are calculated using three satellites, and errors of the calculated location position and time information are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like (not shown in the drawing).

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

When the display 151 and the touch sensor 137 configures a mutual layer structure (hereinafter called 'touch screen'), the display 151 can be used as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

A proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. Further, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. The projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or people or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Next, FIG. 2(*a*) is a front perspective diagram of a mobile terminal according to one embodiment of the present invention. The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Figure 2A:
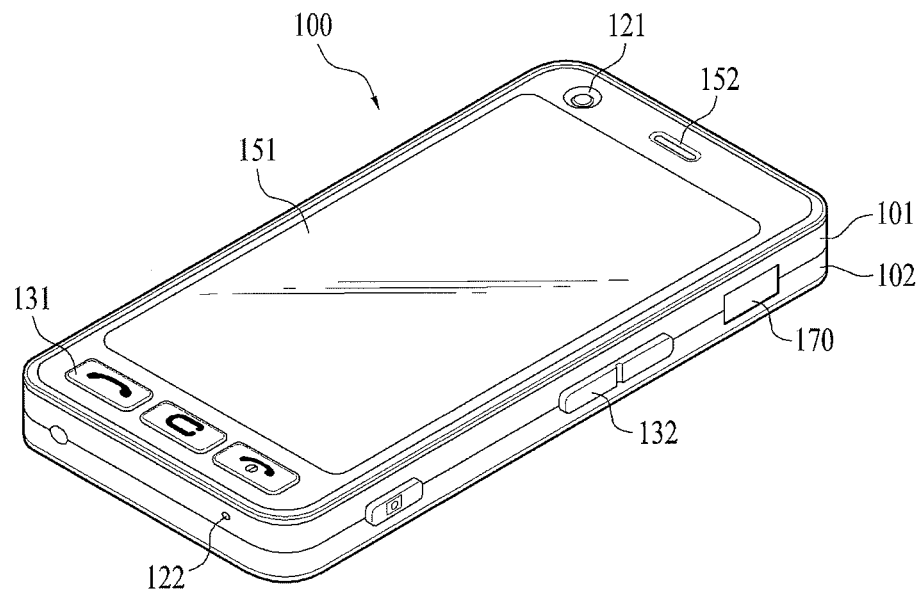
FIG. 2(a) is a front perspective diagram of a mobile terminal according to one embodiment of the present invention.

Referring to FIG. 2(a), the mobile terminal 100 includes a case (101, 102, 103) configuring an exterior thereof. In the present embodiment, the case is divided into a front case 101 and a rear case 102. Various electric/electronic parts are loaded in a space provided between the front and rear cases 101 and 102.

Electronic components can also be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2(a), if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. And, a command for a volume adjustment of sound output from the audio output unit 152 and the like can be input to the second manipulating unit 132, a command for a switching to a touch recognizing mode of the display 151 and the like can be input to the second manipulating unit 133.

Figure 2B:
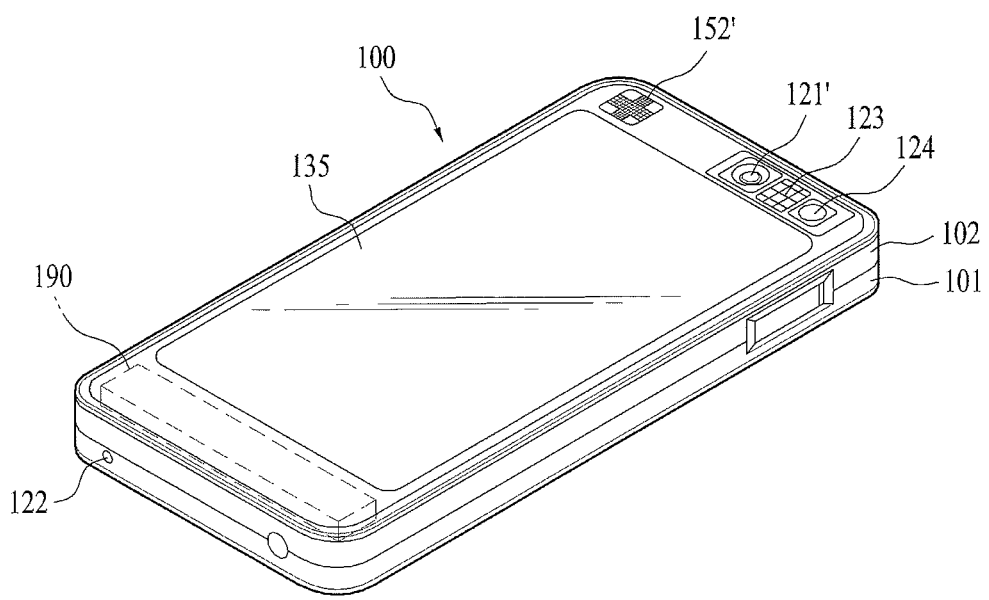
FIG. 2(b) is a rear perspective diagram of a mobile terminal according to one embodiment of the present invention.

Next, FIG. 2(b) is a perspective diagram of a backside of the terminal shown in FIG. 2A. Referring to FIG. 2(b), a camera 121' can be additionally provided to a backside of the terminal body, and more particularly, to the rear case 102. The camera 121 has a photographing direction that is substantially opposite to that of the former camera 121 shown in FIG. 2A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2AA and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

For clarity and convenience of the following description, the mobile terminal according to an embodiment of the present invention includes a display unit 151, a memory 160 and a controller 180. Optionally, the mobile terminal 100 may further include a camera 121. If the display unit 151 includes a touchscreen, implementation of the following embodiments may be further facilitated. Therefore, the following description assumes the display module 151 includes a touchscreen 151.

Figure 3:
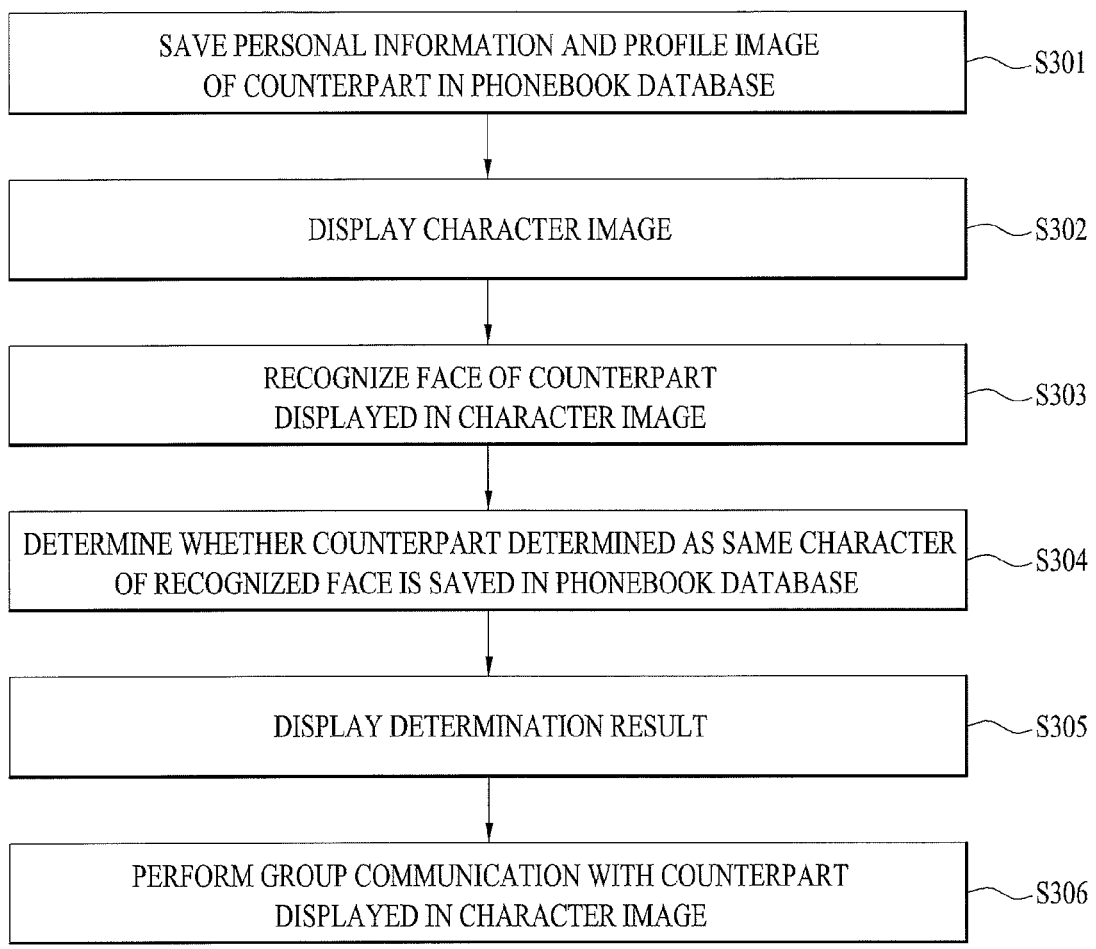
FIG. 3 is a flowchart illustrating an operation of a mobile terminal according to one embodiment of the present invention.

Next, FIG. 3 is a flowchart illustrating an operation of the mobile terminal 100 according to one embodiment of the present invention. Referring to FIG. 3, the controller 180 stores personal information of a counterpart and a profile image of the counterpart in the memory 160 (S301). In particular, the personal information of the counterpart and the profile image of the counterpart may configure a phonebook database in the memory 160. As the phonebook database is configured, a user of the mobile terminal 100 can be provided with search convenience.

In this instance, the personal information of the counterpart may include at least one of a phone number, name, residence address, email address, IM (instant message) service ID, cloud server ID, SNS ID and homepage address of the counterpart. In addition, the profile image may include a photo of the counterpart or a picture representative of the counterpart.

When the personal information and the profile image of the counterpart are saved in the phonebook database, the personal information and the profile image of the counterpart do not have to be simultaneously input. For instance, after the personal information of the counterpart has been saved in the database, the profile image of the counterpart may be added to phonebook database. On the contrary, after the profile image of the counterpart has been saved in the phonebook database, the personal information of the counterpart may be added to the phonebook database.

In the following description, an operation of adding the profile image of the counterpart to the phonebook database is explained in detail with reference to the accompanying drawings.

Figure 4:
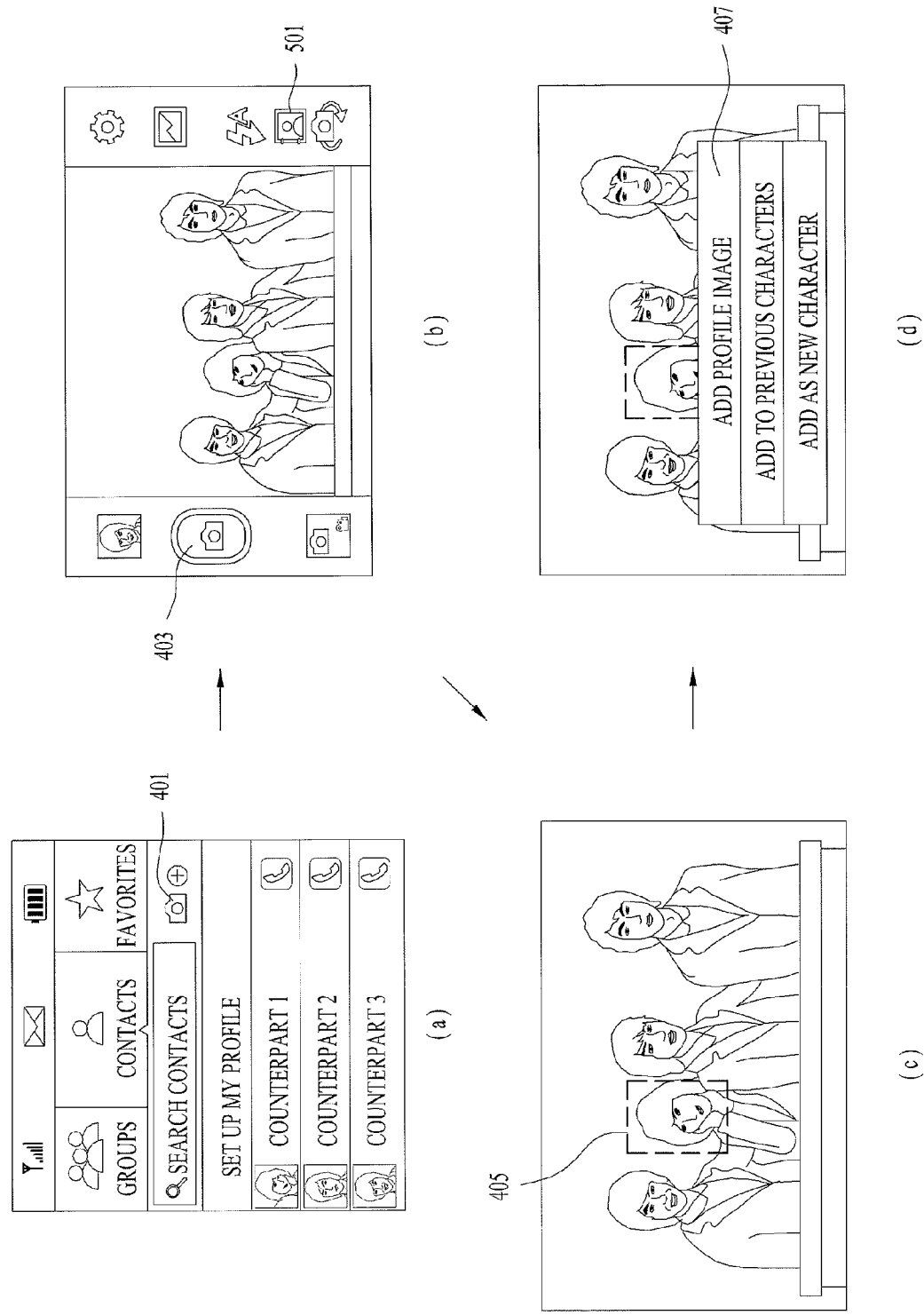
FIG. 4 is a diagram illustrating an example of a process for adding a profile image to a phonebook database by activating a camera in the course of displaying a phonebook.

First of all, the controller 180 can add a profile image of a counterpart to a phonebook database using an image taken via the camera 121. For instance, FIG. 4 is a diagram illustrating one example of a process for adding the profile image to the phonebook database by activating the camera while a phonebook is displayed.

In particular, FIG. 4(a) shows a screen for the phonebook displayed on the touchscreen 151. If a user inputs a command for displaying the phonebook, the controller 180 displays a list of counterparts included in the phonebook database (FIG. 4(a)). While the phonebook is displayed, if the user inputs a command for activation of the camera 121 in order to add a profile photo of a counterpart, the controller 180 activates the camera 121 and then changes an output of the touchscreen 151 into an image input via the camera 121 in the phonebook (FIG. 4(b)). In FIG. 4(a), if the user touches a button 401 of the camera 121, the camera activating command is input for example, by which the present invention is non-limited.

While the camera 121 is in the active state, if the user touches a photographing button 403, the controller stores a captured image in the memory 160 and also displays the captured. When a plurality of characters or people are displayed on the captured image, the user can select a portion 405 to use as a profile image (FIG. 4(c)). If the user selects the portion 405 to use as the profile image, the controller 180 saves the profile image in the phonebook database by being mapped to a corresponding counterpart.

For instance, the controller 180 displays a selection menu 407 shown in FIG. 4(d) and then maps the profile image and the counterpart to each other. In particular, the user can match the profile image to a counterpart previously saved in the phonebook database or a new counterpart not saved in the phonebook database using the selection menu shown in FIG. 4(d). In the selection menu shown in FIG. 4(d), a menu 'Add to existing characters' may be provided to map a profile image to a prescribed one of counterparts previously included in the phonebook database and a menu 'Add as new character' may be provided to assign a profile image to a new user and to save it in the phonebook database.

In the example shown in FIG. 4, if a single character or person is displayed on the captured image, the step (cf. FIG. 4 (c)) of selecting the portion to be used as the profile image by the user may be skipped. On the other hand, in the example shown in FIG. 4, the camera 121 does not have to be activated while displaying the phonebook. For instance, if the user inputs a gallery enter command instead of the camera activating command, the profile image can be added without activating the camera 121.

Meanwhile, FIG. 4 shows that the profile image of the counterpart is added while the phonebook is displayed on the touchscreen 151. However, the method of adding a profile image of a counterpart is not limited by the example shown in FIG. 4. For instance, although the phonebook is not displayed yet, a profile image of a counterpart can be added using at least one of a real-time video input via the camera 121, an image taken via the camera 121, an image received from an external terminal and the like. This is described in detail with reference to FIG. 5 and as follows.

Figure 5:
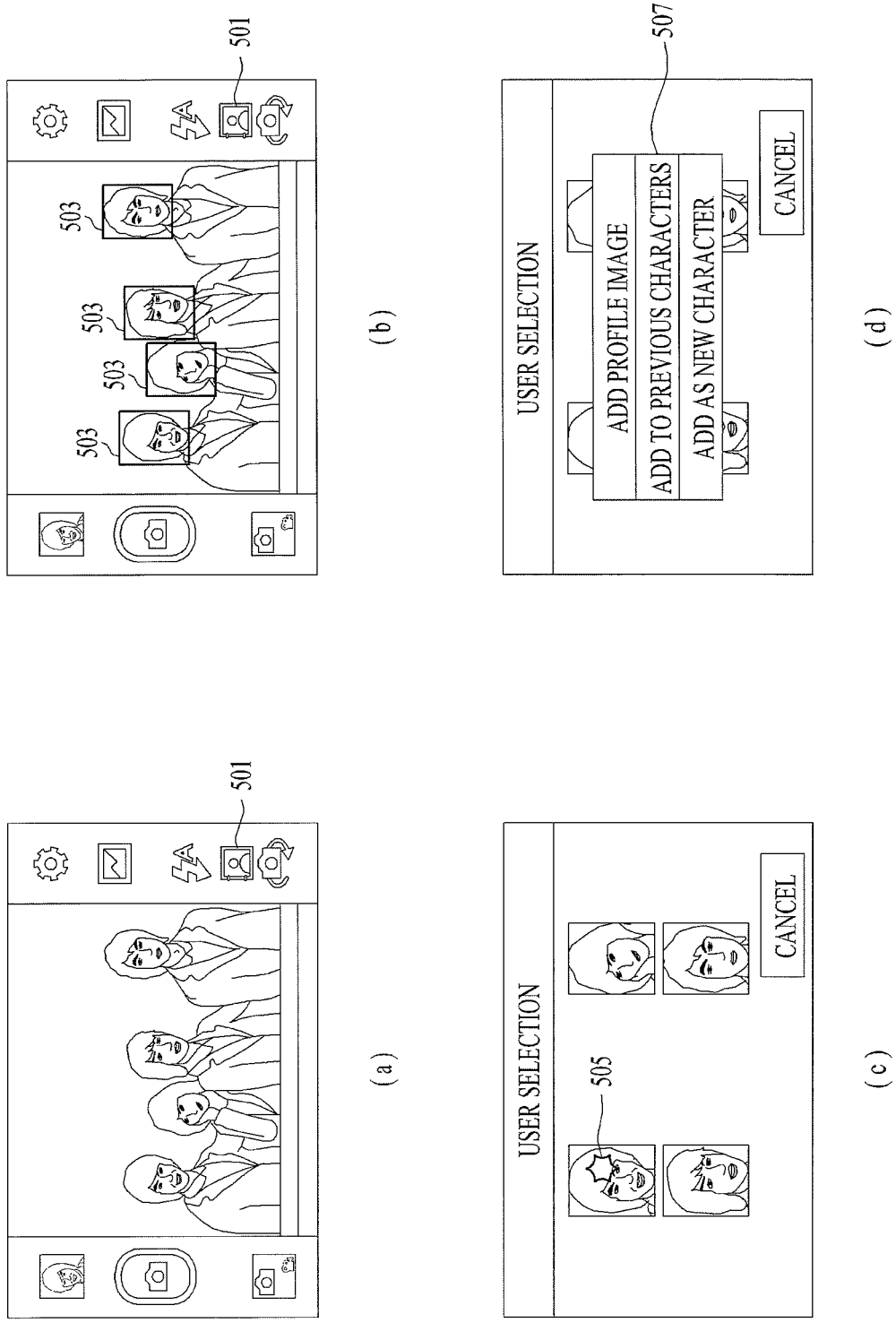
FIG. 5 is a diagram illustrating an example of a process for creating a profile image of a counterpart using an image input by real time via a camera 121.

In particular, FIG. 5 is a diagram illustrating one example of a process for creating a profile image of a counterpart using an image input by real time via the camera 121.

Referring to FIG. 5, when a user activates an application of the camera 121, the controller 180 activates the camera 121 and then control a real-time image input from the camera 121 and a photographing menu (FIG. 5(a)). The controller 180 can recognize a face of a character or person in the real-time input image by applying a face recognition algorithm to the real-time image input from the camera 121. If the face of the character or person in the real-time input image is captured, the controller 180 can display an outline 503 on the recognized faces (FIG. 5(b)). After the face of the specific character or person in the real-time input image has been recognized, and if the user presses a phonebook button 501 of the photographing menu, the controller 180 saves a counterpart, of which profile image is set to the recognized face, in the phonebook database.

For instance, after faces of a plurality of characters or people have been recognized, and if the phonebook button 501 is selected (FIG. 5(b)), the controller 180 displays a selection screen, which is provided to select a face to use as a profile image from a plurality of the recognized faces (FIG. 5(c)). If a user makes a selection 505 of a particular face among the faces, which is to be used as the profile image, the controller 180 displays a selection menu 507 shown in FIG. 5(d) and enables the user to match a counterpart and the profile image to each other. Since the selection menu 507 shown in FIG. 5(d) is identical to the former selection menu described with reference to FIG. 4(d), its details are omitted.

Figure 6:
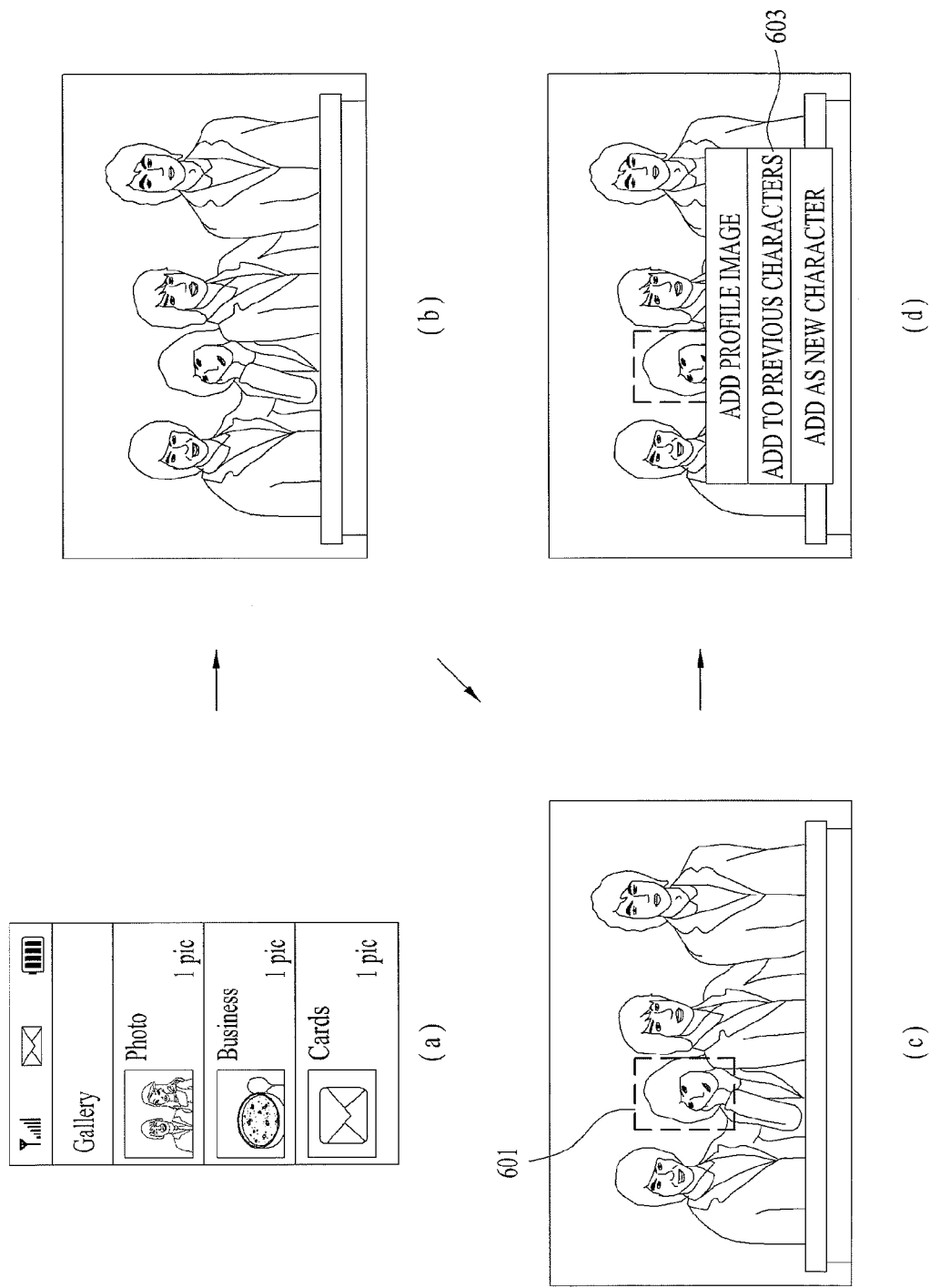
FIG. 6 is a diagram illustrating an example of a process for creating a profile image of a counterpart based on a previously saved image.

Next, FIG. 6 is a diagram illustrating one example of a process for creating a profile image of a counterpart based on a previously saved image, unlike FIG. 5. In this instance, the previously saved image may include an image taken via the camera 121 or an image file received from an external terminal. Generally, a user can view an image previously saved in the memory 160 by activating a gallery application.

Referring to FIG. 6, if a user activates a gallery application, the controller 180 displays on the touchscreen 151 an image file saved in the memory 160 (FIG. 6(a)). If the user selects a prescribed image from the image file list, the controller 180 displays the selected image via the touchscreen 151 (FIG. 6(b)). If a portion 601, which is to be used as a profile image, is selected by the user from the image output via the touchscreen 151 (FIG. 6(c)), the controller 180 saves the profile image of a counterpart in a phonebook database by mapping the portion 601 selected by the user and the counterpart to each other.

For instance, if the user selects the portion 601 to use as the profile image, the controller 180 displays a selection menu 603 shown in FIG. 6(d) to allow the user to match the counterpart and the profile image. Since the selection menu 603 shown in FIG. 6(d) is identical to the former selection menu described with reference to FIG. 4(d), its details are omitted.

As mentioned in the foregoing descriptions with reference to FIGS. 4 to 6, the controller 180 can add a profile image to a phonebook database using a real-time image input from the camera 121 or a profile image saved in the memory 160. Meanwhile, as mentioned in the description of a following example, the profile image is comparable with a character or person image.

Referring now to FIG. 4, the controller 180 displays a character or person image saved in the memory 160 via the touchscreen 151 based on a user input (S302). In this instance, the character or person image may be a photo or picture in which at least one counterpart is displayed. In addition, the character or person image may include one of a photo taken via the camera 121, a photo (or picture) received from an external terminal and the like. However, it may be unnecessary for the character or person image to include such a still cut as a photo, a picture and the like. For instance, the character or person image may include one of a video taken via the camera 121, a video received from an external terminal, a real-time image input via the camera 121 and the like.

Once the character or person image is displayed, the controller 180 recognizes a face of the counterpart displayed in the character or person image using the face recognition algorithm (S303). When a plurality of counterparts are displayed in the character or person image, the controller 180 can recognize a face of each of a plurality of the counterparts. However, the controller 180 does not have to recognize all the faces of a plurality of the counterparts. For instance, the controller 180 can recognize only a face of a prescribed one of a plurality of the counterparts displayed in the character or person image.

Next, FIG. 7 is a diagram illustrating one example of a face recognition algorithm applied range when a plurality of counterparts are displayed on a character or person image. Referring to FIG. 7, when a plurality of counterparts are displayed in a character or person image, the controller 180 can apply the face recognition algorithm to a whole region of the character or person image. In this instance, the controller 180 can recognize faces of all of a plurality of the counterparts (FIG. 7(a)). In particular, in the example shown in FIG. 7(a), faces 701, 703, 705 and 707 of four counterparts are recognized.

Although a plurality of the counterparts are displayed in the character or person image, if an applicable range of the face recognition algorithm is limited, only some of the faces of the counterparts can be recognized. For instance, referring to FIG. 7(b), if a user selects a prescribed region 710 on the character or person image, the controller 180 can control the face recognition algorithm to be limitedly applied to the selected region 710. Because two counterparts are included in the selected region shown in FIG. 7(b), the faces 712 and 714 of two of the four counterparts are recognizable.

When the user selects the region 710 to apply the face recognition algorithm thereto, an applicable region of the face recognition algorithm is reduced. Because an operation range of the controller 180 is reduced, an operation load of the controller 180 is decreased. Therefore, a time taken to recognize a face of a counterpart from a character or person image is reduced and the battery efficiency of the mobile terminal is increased.

Once the face of the counterpart is recognized from the character or person image, the controller 180 compares the recognized face with a profile image of each of a plurality of the counterparts saved in the memory 160 (particularly, the phonebook database) and can then determine whether the counterpart determined as the same character or person of the recognized face is included in the phonebook (S304 in FIG. 3). When a plurality of faces are recognized from the character or person image, the controller 180 can compare each of the recognized faces with the profile image.

Thereafter, the controller 180 displays a result of the determination in the step S304 to be output via the touchscreen 151 (S305). For instance, when the counterpart determined as the same character or person of the recognized face is included in the phonebook database, the controller 180 displays a first icon near the face of the corresponding counterpart on the character or person image. On the contrary, when the counterpart determined as the same character or person of the recognized face does not exist in the phonebook database, the controller 180 displays a second icon, which is different from the first icon, near the face of the corresponding counterpart on the character or person image.

Figure 8:
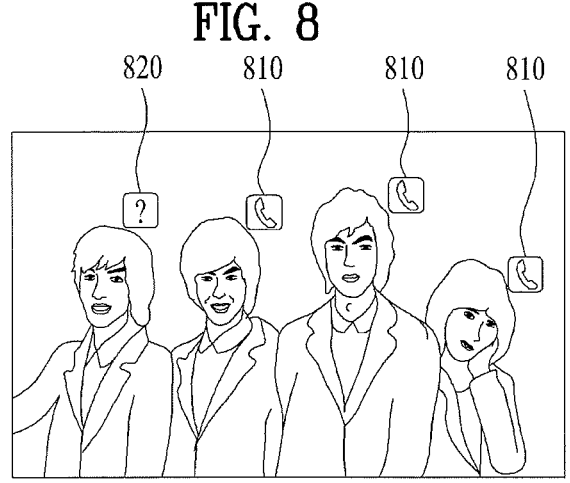
FIG. 8 is a diagram illustrating an example of a process for displaying a first icon and a second icon on a character or person image depending on a presence or non-presence of a counterpart determined as the same character or person of a recognized face.

For instance, FIG. 8 is a diagram illustrating one example of a process for displaying a first icon and a second icon on a character or person image depending on a presence or non-presence of a counterpart determined as the same character or person of a recognized face.

Referring to FIG. 8, when the counterpart determined as the same character or person of the recognized face is included in the phonebook database, the controller 180 displays a first icon 810 (e.g., a phone icon in FIG. 8) near the recognized face. Otherwise, the controller 180 displays a second icon 820 (e.g., a question mark icon in FIG. 8) near the recognized face. Thus, the controller 180 can display a result (S305).

Further, the controller 180 can display the determination result of the step S304 on the character or person image in the example shown in FIG. 8, by which the present invention is not limited. For instance, the controller 180 and display a separate screen with the determination result of the step S304 via the touchscreen 151.

Figure 9:
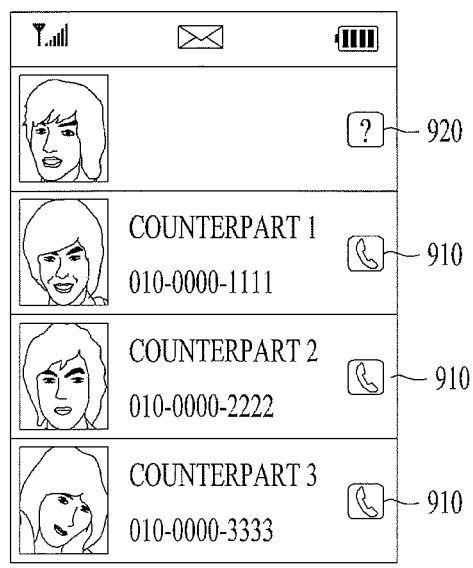
FIG. 9 is a diagram illustrating an example of a screen on which a presence or non-presence of a counterpart determined as the same character or person of a recognized face is displayed.

For instance, FIG. 9 is a diagram illustrating one example of a screen on which a presence or non-presence of a counterpart determined as the same character or person of a recognized face is displayed. Referring to FIG. 9, using a separate screen instead of a character or person image, the controller 180 can display a result of comparison between a counterpart displayed in the character or person image and a counterpart included in a phonebook database. In FIG. 9, one case of determining that a counterpart determined as the same character or person of a recognized face is included in the phonebook database and the other case of determining that a counterpart determined as the same character or person of a recognized face is not included in the phonebook database are separately displayed for example.

In particular, when the counterpart determined as the same character or person of the recognized face exists, the recognized face and personal information (e.g., name & phone number in FIG. 9) are displayed by being matched, whereby information on the corresponding counterpart can be provided to a user. Moreover, the recognized face and a first icon 910 (e.g., a phone icon in FIG. 9) are displayed by being matched for example. On the contrary, if the counterpart determined as the same character or person of the recognized face does not exist, the recognized face and a second icon 920 (e.g., a question mark icon in FIG. 9) can be displayed by being matched for example.

In the example shown in FIG. 9, the user can check one of a presence or non-presence of the displayed personal information of the counterpart matching the recognized face and the icon matching the recognized face, and can thereby recognize whether the counterpart determined as the same character or person is included in the phonebook.

In addition, FIG. 9 shows one example that the personal information of the counterpart can be displayed as well if the counterpart determined as the same character or person of the recognized face exists. Moreover, the contents of messages transceived with the counterpart determined as the same character, the contents of emails transceived with the counterpart determined as the same character, the history of incoming & outgoing calls with the counterpart determined as the same character or person can be displayed by matching the recognized face.

After the counterpart determined as the same character or person of the recognized face is included in the phonebook has been determined, the controller 180 can perform various operations based on user inputs. For instance, in the examples shown in FIGS. 8 and 9, the controller 180 can attempt a call connection to a phone number of the counterpart determined as the same character or person of the corresponding recognized face or send a message (e.g., a text message (SMS, LMS, MMS, etc.), an instant message, etc.) to the counterpart. When the message is sent to the counterpart, the controller 180 automatically attaches a character or person image attached to the message. As the character or person image is automatically attached to the message, the character or person image can be conveniently shared with the counterpart displayed in the character or person image.

Also, when the first icon is touched, the controller 180 can attempt an access to at least one of an SNS account, a cloud account and a homepage of the counterpart determined as the same character or person of the corresponding recognized face. On the other hand, in the examples shown in FIGS. 8 and 9, when the user touches the second icon, the controller 180 can display a screen to add a new counterpart using a profile image as a corresponding recognized face to the phonebook database.

Figure 10:
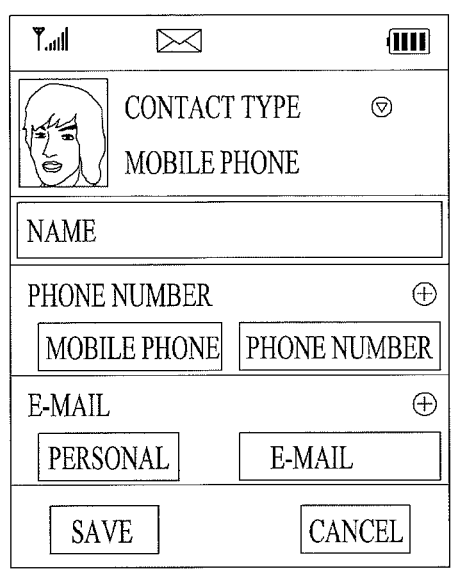
FIG. 10 is a diagram illustrating an example of a screen provided to a user to add a new counterpart of which recognized face is used as a profile image.

For instance, FIG. 10 is a diagram for one example of a screen allowing a user to add a new counterpart of which a recognized face is used as a profile image. In the examples shown in FIG. 8 and FIG. 9, if the user touches the second icon, the controller 180 can display the screen shown in FIG. 10. In the example shown in FIG. 10, the user can save a new user in the phonebook database by inputting personal information of a counterpart to add.

According to the embodiment mentioned in the foregoing description, the communication (e.g., call, message sending, etc.) with one of the counterparts displayed in the character or person image is performed, by which the present invention is not limited. For instance, the controller 180 performs a group communication on a plurality of the counterparts displayed in the character or person image (S306 in FIG. 3). In this instance, the group communication corresponds to a communication with a plurality of counterparts as a group call, a group chat and the like.

Prior to performing the group communication, the controller 180 can make a request for personal information of a counterpart, of which personal information is not saved in the phonebook database, to a counterpart having personal information saved in the phonebook database among a plurality of counterparts displayed in a character or person image.

For instance, when a plurality of counterparts are displayed in a character or person image, a prescribed counterpart determined as the same character or person among the counterparts displayed in the character or person image may be saved in the phonebook database, while the rest of the counterparts are not saved in the phonebook database. In this instance, the controller 180 can make a request for personal information of one counterpart, of which personal information is not saved in the phonebook database, to another counterpart having personal information saved in the phonebook database among a plurality of the counterparts displayed in the character or person image. This is described in detail with reference to FIG. 11 as follows.

Figure 11:
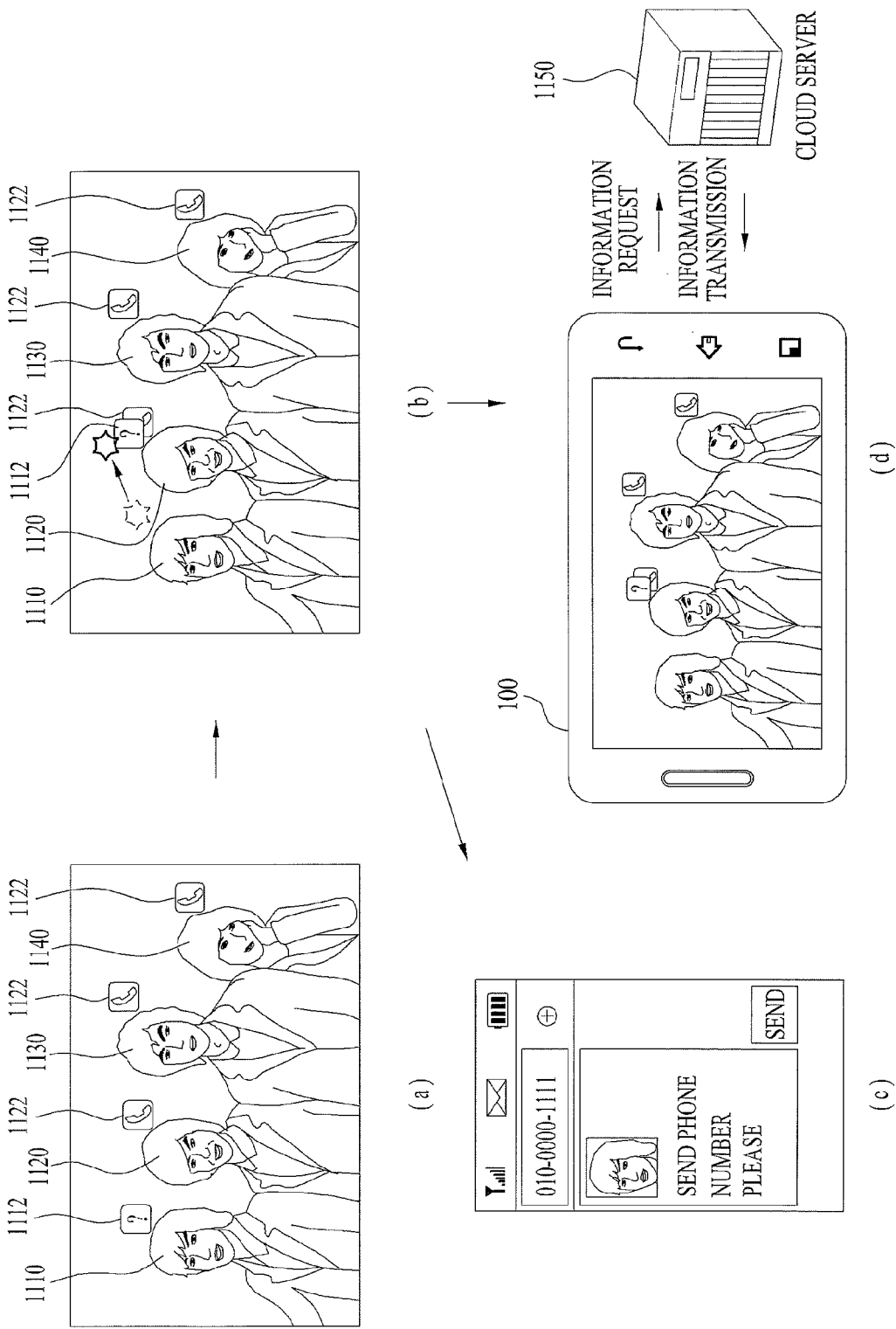
FIG. 11 is a diagram illustrating one example of a process for making a request for information on one counterpart to another counterpart determined as the same character or person among recognized faces.

In particular, FIG. 11 is a diagram illustrating one example of a process for making a request for information on one counterpart to another counterpart determined as the same character or person among recognized faces. For clarity of the following description, a plurality of characters or people displayed in a character or person image shown in FIG. 11 are named first to fourth counterparts 1110, 1120, 1130 and 1140 in left-to-right order, respectively.

Referring to FIG. 11, when a plurality of characters or people are displayed in a character or person image, and if the controller 180 recognizes a plurality of faces, one user determined as the same character or person among a plurality of the recognized faces may be included in a phonebook, while another user determined as the same character or person among a plurality of the recognized faces may not be included in the phonebook (FIG. 11 (*a*)).

In this instance, the controller 180 can display a first icon 1122 or a second icon 1112 near each of a plurality of the recognized faces depending on a result of determination. In the example shown in FIG. 11(*a*), the second icon 1112 is displayed near the first counterpart 1110, while the first icon 1122 is displayed near each of the second to fourth counterparts 1120, 130 and 1140.

If the second icon 1112 is dragged to the first icon 1122 or the face of the counterpart corresponding to the first icon 1122, the controller 180 can make a request for personal information of the counterpart corresponding to the second icon 1112 to the selected counterpart. In particular, if the second icon 1112 near the first counterpart 1110 in FIG. 11(*a*) is dragged to the first icon 1122 near the second counterpart 1120 (FIG. 11(*b*)), the controller 180 can make a request for the personal information of the first counterpart 1110 to the second counterpart 1120.

In more detail, the controller 180 can send a text message, to which a face image corresponding to the second icon 1112 is attached, to a phone number of the selected counterpart (i.e., the second counterpart 1120 in FIG. 11(*b*)). In this instance, referring to FIG. 11(*c*), the controller 180 can control the face image of the counterpart matching the second icon 1112 to be automatically attached to the text message together with a preset text. Then, the second counterpart 1120 checks the face image attached to the text message sent from the mobile terminal 100 and can then provide the information of the first counterpart 1110 to the mobile terminal 100.

In another example, the controller 180 can make a request for the personal information of the first counterpart 1110 to a cloud server 1150. In particular, the controller 180 accesses the cloud server 1150 and can then obtain the personal information of a counterpart determined as the same character or person of the face of the first counterpart 1110 from a phonebook database saved in a storage of a cloud account of the second counterpart 1120.

In the examples shown in FIGS. 11(*c*) and 11(*d*), if the personal information of the first counterpart 1110 is received, the controller 180 can display the second icon 1112 displayed near the first counterpart 1110 to be changed into the first icon 1122.

The step of receiving personal information of a counterpart, of which personal information is not saved in a phonebook database, among a plurality of counterparts displayed in a character or person image is provided to update the personal information of the corresponding counterpart, thereby enabling a corresponding user to join a group communication.

In the following description, a process for performing such a group communication with a plurality of counterparts displayed in a character or person image as a group call, a group chat and the like is explained in detail with reference to FIGS. 12 and 13.

Figure 12:
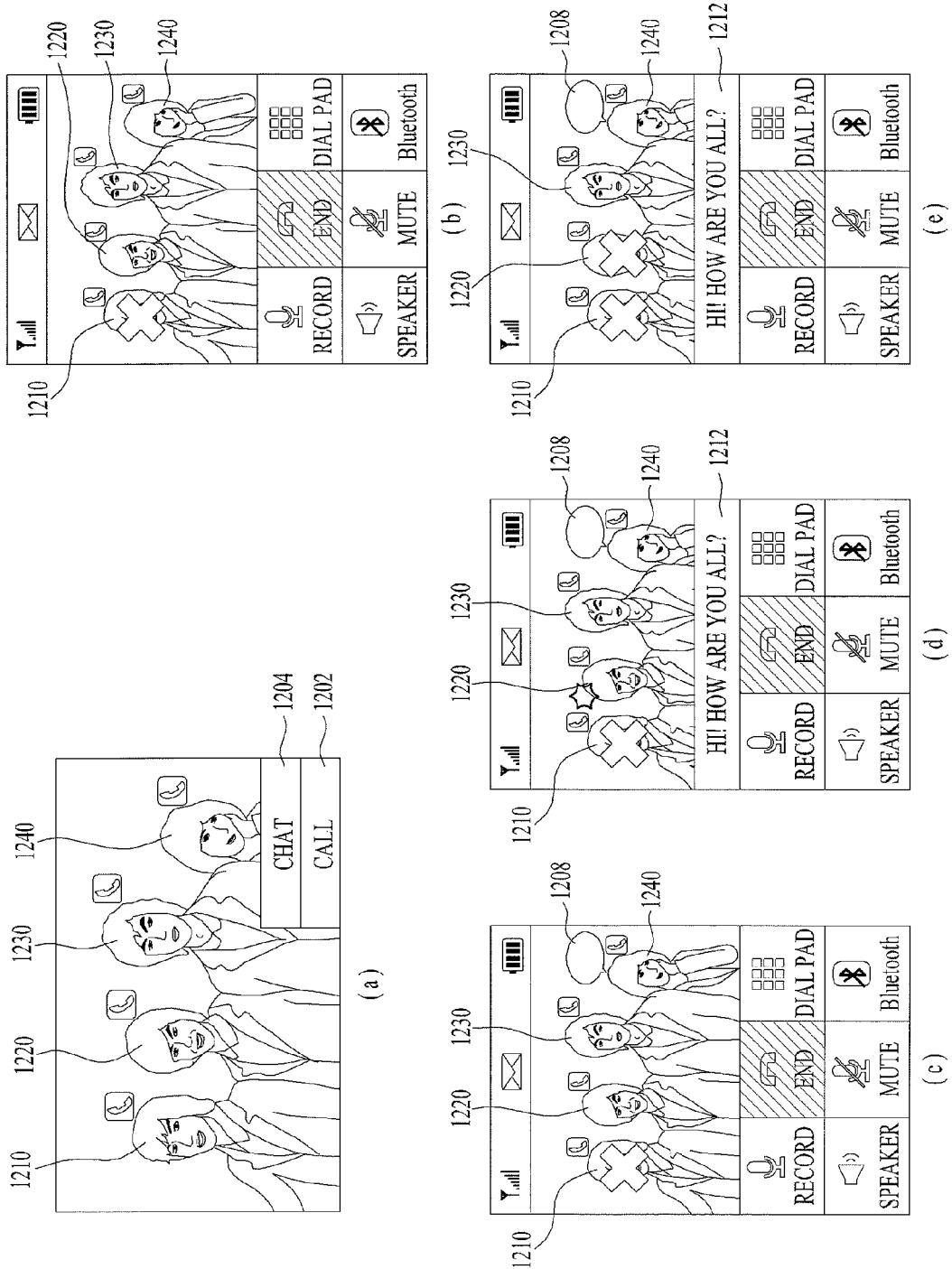
FIG. 12 is a diagram illustrating one example of a process for performing a group call with a plurality of counterparts displayed on a character or person image.

In particular, FIG. 12 is a diagram illustrating one example of a process for performing a group call with a plurality of counterparts displayed on a character or person image. Referring to FIG. 12, while a plurality of counterparts are displayed in a character or person image, and if a user inputs a group call command, the controller 180 can attempt a group call connection to a plurality of the counterparts displayed in the character or person image (FIG. 12(*a*)).

For instance, in the example shown in FIG. 12(*a*), if the user touches a button 'call' 1202, the controller 180 can attempt the group call connection on a plurality of the counterparts. In the example shown in FIG. 12(*a*), assume that personal information (particularly, phone numbers) on first to fourth counterparts 1210, 1220, 1230 and 1240 displayed in the character or person image are saved in a phonebook database. If the personal information (particularly, phone number) on at least one of the first to fourth counterparts 1210, 1220, 1230 and 1240 is not saved in the phonebook database, the group call is attempted by excluding the corresponding user.

In performing the group call, the controller 180 can attempt the group call connection using the character or person image as a background. In particular, the controller 180 can display a plurality of the counterparts in the character or person image in that the counterparts succeeding in the group call attempt and the counterparts failing in the group call attempt are visually discriminated from each other. In FIG. 12(*b*), a letter 'X' 1206 is marked on the counterpart (i.e., the first counterpart 1210) failing in the group call connection for example.

While the group call is in progress, the controller 180 can display a counterpart, which generates audio data, in the character or person image. For instance, when the audio data is received from the fourth counterpart 1240, the controller 180 emphasizes the face of the fourth counterpart 1240 in the character or person image or display an indication icon to be displayed near the corresponding face. In FIG. 12(*c*), a conversation box 1208 near the face corresponding to the fourth counterpart 1240, for example.

Moreover, the controller 180 can display a content of audio data transceived while the group call communication as a text 1212. If the call content is displayed as the text, the users can obtain the call content more clearly through an output of the touchscreen 151. In FIG. 12(*d*), the content of the audio data transceived while the group call communication is displayed as a text on a bottom end of the character or person image, for example.

While the group call communication is in progress, the controller 180 can end the call connection with at least one portion of a plurality of the counterparts while the group call communication. For instance, referring to FIG. 12(*d*), while the group call with the second to fourth counterparts 1220, 1230 and 1240 is in progress, if the face of the second counterpart 1220 displayed in the character or person image is selected, the controller 180 end the group call communication with the second counterpart 1220 as shown in FIG. 12(*e*).

In the following description, a process for performing a group chat with a plurality of counterparts displayed in a character or person image is explained in detail with reference to FIG. 13. In particular, FIG. 13 is a diagram illustrating one example of a process for performing a group chat with a plurality of counterparts displayed in a character or person image.

Figure 13:
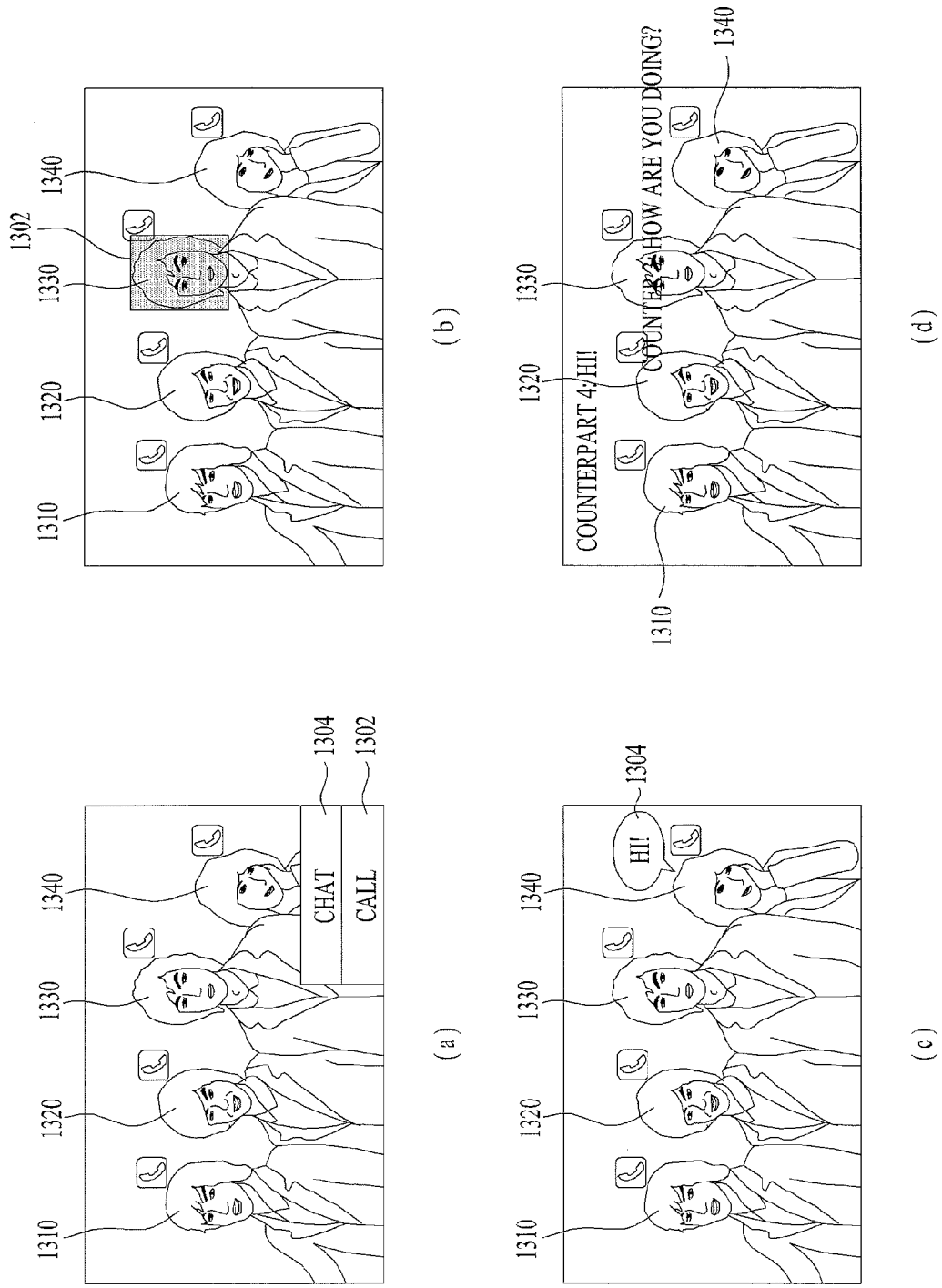
FIG. 13 is a diagram illustrating one example of a process for performing a group chat with a plurality of counterparts displayed in a character or person image.

Referring to FIG. 13, while a plurality of counterparts are displayed in a character or person image, if a user inputs a group chat command, the controller 180 can control a group chat to be performed on a plurality of the counterparts displayed in the character or person image (FIG. 13(*a*)). In this instance, messages can be transceived between the user and the counterpart using such a messaging service as SMS, LMS, MMS and the like or may include instant messages.

In the example shown in FIG. 13(*a*), if a button 'chat' 1304 is touched, the controller 180 can perform the group chat with a plurality of the counterparts. Further, the personal information (particularly, phone numbers, IM service IDs, etc.) on the first to fourth counterparts 1310, 1320, 1330 and 1340 displayed in the character or person image are saved in a phonebook database. If the personal information on at least one of the first to fourth counterparts 1310, 1320, 1330 and 1340 is not saved in the phonebook database, the group chat is attempted by excluding the corresponding user. In performing the group chat, the controller 180 may control the group chat to proceed using the character or person image as a background.

While the group chat is in progress, and if the user inputs a message using a virtual keyboard, the controller 180 provide the message to a plurality of the counterparts (particularly, a plurality of the counterparts displayed in the character or person image) joining the group chat. For instance, in the example shown in FIG. 13(*a*), the message input by the user may be sent to all of the first to fourth counterparts 1310, 1320, 1330 and 1340.

In addition, the controller 180 cannot send the message written by the user to at least one of the counterparts joining the group chat based on a user input. For instance, while the group chat is in progress, and if the user touches a face of the third counterpart 1330, the controller 180 can deliver the message only to the first, second and fourth counterparts 1310, 1320 and 1340 except the third counterpart 1330.

On the contrary, the controller 180 can deliver the message only to the third counterpart 1330 except the first, second and fourth counterparts 1310, 1320 and 1340. In this instance, referring to FIG. 13(*b*), the controller 180 can display the counterpart selected by the user by being visually discriminated from the rest of a plurality of the counterparts joining the group chat. In FIG. 13(*b*), a shade effect 1302 is given to the face of the third counterpart 1330, for example.

Also, when receiving a message from a counterpart joining the group chat, the controller 180 can identify the corresponding counterpart. For instance, in FIG. 13(*c*), a conversation box 1304, in which a message content is written, is displayed near a face of the counterpart having sent the message, for example. Referring to FIG. 13(*c*), the counterpart having sent the message is easily recognizable if the chat content is displayed near the face of the counterpart having sent the message.

Alternatively, the controller 180 can identify the counterpart having sent the message by controlling the message content to be displayed together with a name of the counterpart having sent the message. In FIG. 13(*d*), both of the message content and the name of the counterpart having sent the message are displayed in the character or person image for example.

According to the description with reference to FIG. 3, after the determination result has been displayed (S305), the group communication with the counterpart displayed in the character or person image is performed (S306), by which the present invention is not limited. For instance, the step of displaying a result from determining whether one counterpart determined as the same character or person of another counterpart displayed in the character or person image is included in the phonebook database can be omitted.

For instance, this step may be performed after the step S305 in response to a user selection. In particular, the step of displaying the first icon (e.g., phone icon) and the second icon (e.g., question mark icon) in FIGS. 8, 9, and 11-13 can be omitted. Moreover, the mobile terminal 100 according to an embodiment of the present invention is used in performing a group communication with counterparts displayed in a character or person image and can be applied to other usages.

As mentioned in the foregoing description, the mobile terminal 100 according to an embodiment of the present invention is usable to share a character or person image with a counterpart displayed in the character or person image as well as to share a schedule with a counterpart displayed in a character or person image. Moreover, the mobile terminal 100 according to an embodiment of the present invention is usable to share various contents, which include music, video, e-book, application installation file and the like, with a counterpart displayed in a character or person image.

According to the description with reference to FIG. 3, the character or person image used in performing the group call or the group chart includes a photo taken via the camera 121 or a photo received from an external terminal, by which the present invention may be non-limited. For instance, FIG. 14 is a diagram illustrating one example of a process for configuring a character or person image having a plurality of counterparts displayed thereon using a profile image of a counterpart included in a phonebook database.

Referring to FIG. 14, a basic frame for configuring a same character or person image is output, for example (FIG. 14(a)). If a user selects an add button 1402 (FIG. 14(a)), the controller 180 can display a list of counterparts saved in a phonebook database (FIG. 14(b)). If the user selects a counterpart (e.g., Counterpart 2) to join in a group call or a group chat from the list (FIG. 14(b)), the controller 180 can display a profile image 1420 of the selected counterpart on the basic frame (FIG. 14(c)). Thus, referring to FIG. 14, the controller 180 can configure a character or person image by adding a profile image of a counterpart, which is to join a group call or a group chat, onto a basic frame.

Moreover, when a counterpart, on which a group communication will be performed, is not included in a photo taken via the camera 121 or a photo received from an external terminal, it can configure a character or person image by further adding a profile image in a phonebook. For instance, FIG. 15 is a diagram illustrating one example of a process for configuring a character or person image by adding a profile image of a counterpart, who is to join a group communication, onto a previously saved image.

Referring to FIG. 15, the first to fourth charters 1501, 1503, 1505 and 1507 are displayed in a previously saved image (FIG. 15(a)). When a counterpart, on which a group communication will be performed, is not included in the image shown in FIG. 15(a), a user can add a counterpart, who is to be invited to the group communication, to image by performing an appropriate operation. For instance, if an add button 1510 shown in FIG. 15(b) is selected, the controller 180 may control a list of counterparts included in a phonebook database to be displayed (FIG. 15(c)).

Thereafter, if the user selects a counterpart (e.g., Mary in FIG. 15(c)), who is to be invited to the group communication, from the counterpart list shown in FIG. 15(c), the controller 180 can add a profile image 1530 of the counterpart, who is to be invited to the group communication, to the previously saved image.

As mentioned in the foregoing descriptions with reference to FIGS. 14 and 15, by increasing the number of characters or people displayed in a character or person image using profile images included in a phonebook database, the present invention may freely adjust the number of counterparts to join a group communication.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a wireless communication unit configured to wirelessly communicate with at least one other terminal;
a memory configured to store a phonebook database including personal information and a profile image of each of a plurality of counterparts;
a display unit configured to display an image stored in the memory; and
a controller configured to:
recognize faces of people in the image displayed on the display unit,
extract available personal information from the phonebook database of counterparts corresponding to the recognized faces,
select a group call or a group chat, via the wireless communication unit, with the corresponding counterparts using the extracted personal information,
in response to the selection of the group chat, control the display unit to display a conversation box of each counterparts corresponding to the recognized faces in a first region within the displayed image and control the display unit to display a name of each counterparts corresponding to the recognized faces in a second region within the displayed image,
when personal information of a counterpart among the recognized faces is failed to be extracted from the phonebook database, transmitting via the controller, a request for the personal information to a cloud server, accessing the cloud server and retrieving the personal information of a counterpart determined as the same character or person of the face of a specific counterpart from another phonebook database saved in a storage of a cloud account, and
when a second icon is dragged to a first icon or a face of the counterpart corresponding to the first icon, the controller is further configured to send a request for personal information of the counterpart corresponding to the second icon to the counterpart corresponding to the first icon, wherein the first icon indicates the face is recognized while the second icon indicates a failure to recognize the face.
2. The mobile terminal of claim 1, wherein the controller is further configured to determine whether the recognized faces correspond to counterparts included the phonebook database, and wherein counterparts that are included in the phonebook database are first recognized faces and counterparts that are not included in the phonebook database are second recognized faces.

3. The mobile terminal of claim 2, wherein the controller is further configured to identify the first recognized faces using a first icon displayed near the first recognized faces, and identify the second recognized faces using a second icon displayed near the second recognized faces.

4. The mobile terminal of claim 3, wherein if a corresponding second icon is selected, the controller is further configured to create a new corresponding counterpart having the second recognized face as a profile image in the phonebook database.

5. The mobile terminal of claim 2, wherein the controller is further configured to access the cloud account of at least one of the counterparts corresponding to the first recognized faces to retrieve the personal information of at least one counterpart corresponding to the second recognized faces.

6. The mobile terminal of claim 2, wherein the controller is further configured to access an SNS account or a homepage of at least one of the counterparts corresponding to the first recognized faces to retrieve the personal information of at least one counterpart corresponding to the second recognized faces.

7. The mobile terminal of claim 1, wherein the controller is further configured to display on the display unit the image including the faces of the people as a background image when performing the group call or group chat.

8. The mobile terminal of claim 7, wherein the controller is further configured to display a success indication near a recognized face included in the image for which a call connection has been successful and to display a fail indication near a recognized face included in the image for which a call connection has not been successful.

9. The mobile terminal of claim 7, wherein while the group call is in progress, the controller is further configured to control the display unit to visually indicate a person currently speaking.

10. The mobile terminal of claim 7, wherein while the group call is in progress, the controller is further configured to control the display unit to display language captions for speech included in the call.

11. The mobile terminal of claim 7, wherein while the group call is in progress, and if a specific recognized face is selected from the image, the controller is further configured to terminate the call with the person corresponding to the specific recognized face.

12. The mobile terminal of claim 7, wherein while the group call is in progress, and if a specific recognized face is selected from the image, the controller is further configured to initiate a separate message communication with only the person corresponding to the specific recognized face.

13. The mobile terminal of claim 7, wherein while the group call is in progress, and if a specific recognized face is selected from the image, the controller is further configured to initiate a separate message communication with only persons excluding the person corresponding to the recognized face.

14. The mobile terminal of claim 7, wherein while the group call is in progress, the controller is further configured to control the display unit to visually distinguish a recognized face corresponding to a person having sent a message.

15. The mobile terminal of claim 1, wherein the image includes a combination of profile images included in the phonebook database.

16. The mobile terminal of claim 1, further comprising:
a camera configured to capture a real-time image as corresponding to the image including the recognized faces.

17. A method of controlling a mobile terminal, the method comprising:
storing, in a memory, a phonebook database including personal information and a profile image of each of a plurality of counterparts;
recognizing, via a controller, faces of people in an image displayed on a display unit;
extracting, via the controller, available personal information from the phonebook database of counterparts corresponding to the recognized faces;
selecting, via the controller controlling a wireless communication unit, a group call or a group chat with the corresponding counterparts using the extracted personal information;
in response to the selection of the group chat, control the display unit to display a conversation box of each counterparts corresponding to the recognized faces in a first region within the displayed image and control the display unit to display a name of each counterparts corresponding to the recognized faces in a second region within the displayed image,
when personal information of a counterpart among the recognized faces is failed to be extracted from the phonebook database, transmitting via the controller, a request for the personal information to a cloud server, accessing cloud server and retrieving personal information of a counterpart determined as the same character or person of the face of a specific counterpart from another phonebook database saved in a storage of a cloud account; and
when a second icon is dragged to a first icon or a face of the counterpart corresponding to the first icon, the controller is further configured to send a request for personal information of the counterpart corresponding to the second icon to the counterpart corresponding to the first icon, wherein the first icon indicates the face is recognized while the second icon indicates a failure to recognize the face.

18. The method of claim 17, further comprising:
identifying first recognized faces of the corresponding counterparts that are included in the phonebook database and identifying second recognized faces of the corresponding counterparts that are not included in the phonebook database.

* * * * *